United States Patent [19]

Smith et al.

[11] Patent Number: 5,312,093
[45] Date of Patent: May 17, 1994

[54] VIBRATION ISOLATOR WITH TWO PAIRS OF FLUID CHAMBERS WITH DIAGONAL FLUID COMMUNICATION

[75] Inventors: Gary T. Smith, Canyon Country; Edwin L. Banks, Lake View Ter., both of Calif.

[73] Assignee: Applied Power Inc., Butler, Wis.

[21] Appl. No.: 826,712

[22] Filed: Jan. 28, 1992

[51] Int. Cl.⁵ .............................................. F16F 13/00
[52] U.S. Cl. ................................. 267/140.11; 267/219
[58] Field of Search ................... 267/140.11, 140.13, 267/140.3–140.5, 141.1, 219, 35; 180/300, 312; 248/562, 636, 554, 557; 244/53 R, 54

[56] References Cited

U.S. PATENT DOCUMENTS

| | | | |
|---|---|---|---|
| 3,836,134 | 9/1974 | Lowe et al. | 267/152 |
| 4,236,607 | 12/1980 | Halwes et al. | 188/379 |
| 4,572,321 | 2/1986 | Morita | 180/297 |
| 4,712,777 | 12/1987 | Miller | 267/140.1 |
| 4,733,854 | 3/1988 | Miyamoto | 267/219 X |
| 4,811,919 | 3/1989 | Jones | 244/54 |
| 4,844,430 | 7/1989 | Miya et al. | 267/140.3 x |
| 4,872,649 | 10/1989 | Kawamata | 267/136 |
| 4,971,300 | 11/1990 | Ticks | 267/219 X |
| 5,004,215 | 4/1991 | Aubry et al. | 180/312 X |
| 5,009,402 | 4/1991 | Sato | 267/140.1 |
| 5,009,403 | 4/1991 | Kato et al. | 267/140.1 |
| 5,174,552 | 12/1992 | Hodgson et al. | 267/219 X |

FOREIGN PATENT DOCUMENTS

| | | | |
|---|---|---|---|
| 9222637 | 12/1984 | Japan | 267/140.13 |
| 4023722 | 1/1990 | Japan | 267/140.11 |
| 2137310 | 10/1984 | United Kingdom . | |

OTHER PUBLICATIONS

Applicant's Exhibit A, Data Sheet No. 14B, "Cajon Snubber Fittings (Gauge Protectors)" of Cajon Company, Macedonia, Ohio, dated 1974–1980, admitted prior art.
Applicant's Exhibit B, SAE Technical Paper Series 840259, "A New Generation of Engine Mounts", dated Feb. 27–Mar. 2, 1984.
Applicant's Exhibit C, SAE Technical Paper Series 851650, "Hydraulic Engine Mount Isolation", dated Sep. 23–26, 1985.
Applicant's Exhibit D, "User's Guide to the Application of Fluidlastic ® Mounts" (LL-7418) by J. R. Podesta, Lord Corporation.
vol. 8, No. 76 (M-288)(1513) Apr. 9, 1984–Patent Abstract of Japan.

*Primary Examiner*—Robert J. Oberleitner
*Assistant Examiner*—Josie A. Ballato
*Attorney, Agent, or Firm*—Quarles & Brady

[57] ABSTRACT

A vibration isolator has four fluid filled variable volume load bearing chambers, with two arranged on one side of a core and the other two on the other side. The core and chambers are contained within a frame, with the chambers extending between the core and the frame, so that vibrating the core axially compresses or extends the chambers. Diagonally opposite pairs of chambers are each connected with a separate fluid track, and the two fluid tracks may be tuned to have different resonant frequencies or the same resonant frequency. The chambers are defined by elastomeric bodies which may be reinforced using a tubular shaped reinforcing element adjacent to the chamber, to help contain the pressures within the chamber without materially increasing the compression strength of the elastomeric bodies. A fluid expansion chamber communicates with the fluid envelope of the chambers and tracks through porous flow restriction elements which allow flow to or from the expansion chamber in response to temperature changes of the fluid but snub significant flow to or from the expansion chamber which may otherwise be caused by subjecting the isolator to vibrations.

10 Claims, 6 Drawing Sheets

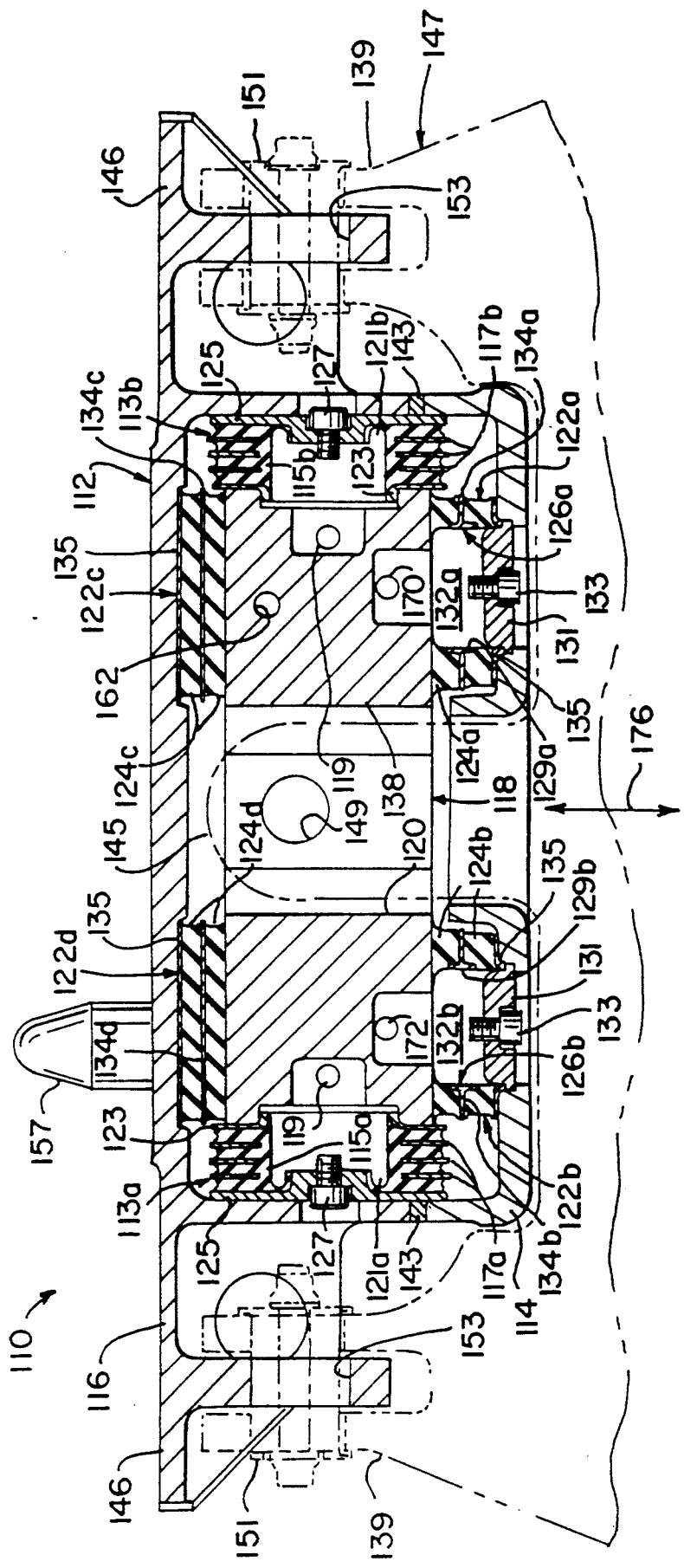

5,312,093

VIBRATION ISOLATOR WITH TWO PAIRS OF FLUID CHAMBERS WITH DIAGONAL FLUID COMMUNICATION

FIELD OF THE INVENTION

This invention relates to vibration isolators and in particular to such an isolator having fluid-filled elastomeric isolation elements.

BACKGROUND OF THE INVENTION

Vibration isolators are well known and are commonly used to mount engines to a frame. For example, in an automobile, an elastomeric or other vibration isolator mounts the engine to the frame to curtail the transmission of vibrations from the engine to the frame. Similarly, aircraft engines are mounted to the air frame using vibration isolation mounts.

It is desirable for vibration isolation mounts to be strong and stiff when they are statically loaded so as to support the weight of the engine or other element they support and to counteract other static forces. As an engine is accelerated, it will typically reasonate at a certain speed, which is known as the resonant frequency. At the resonant frequency, the vibrations generated by the engine are at their highest amplitude and it is desirable to curtail their transmission to the automotive, aircraft or other frame to which the engine is mounted.

It is a characteristic of elastomeric isolators that they become stiffer when they are subjected to higher frequency vibrations. Thus, at the resonant frequency of an engine, an elastomeric isolator is stiffer than when the engine is static, which is exactly the opposite of the desired characteristic of the isolator.

Elasto-hydraulic isolators have also been developed in which fluid filled elastomeric isolation elements are employed in an effort to reduce the stiffness of the vibration isolator at the resonant frequency of the engine. Typically, one or two elastomeric chambers are provided and are filled with an incompressible fluid. In the single chamber type, fluid is pumped by the chamber as it is subjected to vibrations through an inertia fluid track, which is usually in communication with another variable volume chamber of a significantly lower volume stiffness. In the two chamber type, the fluid is pumped in an inertia fluid track which communicates with both chambers and the chambers are arranged so that as the volume of one increases, the volume of the other diminishes, and vice versa. The pumping of the fluid in the fluid track dissipates the energy of the vibrations, and the fluid track can be tuned, for example by varying its area and/or length, so that the energy dissipation is maximized at the vibration frequency sought to be isolated.

The frequency at which the stiffness of the vibration isolator is reduced is known as the notch frequency, because on a plot of stiffness versus frequency the stiffness curve dips there. It is desirable to make the notch as wide and as deep as possible, as well as to tune it to correspond with the resonant frequency of the engine, for the most effective vibration isolation.

Prior fluid filled vibration isolators have resulted in improvements in isolating higher frequency vibrations over elastomeric mounts. However, it still remains desirable to further reduce the ratio of dynamic stiffness to static stiffness in vibration isolation mounts, i.e., to increase the depth and bandwidth of the notch.

Moreover, in some applications, more than one frequency can be sought to be isolated. Prior isolators have been limited to isolating a single frequency, with a certain bandwidth spanning either side of the frequency. It is therefore desirable to be able to tune in more than one frequency, with the effect of increasing the overall bandwidth of vibration suppression.

In addition, a problem with fluid filled vibration isolation mounts has been that they can be extremely sensitive to fluctuations in temperature. Fluctuations in temperature cause the fluid in the chamber to expand or contract, which results in shifts in the fluid pressure that can greatly vary the stiffness of the vibration isolator. Pressure equalization of the fluid in response to temperature fluctuations has been provided in the prior art, but resulted in the fluid of the isolation chambers being in continuous communication with an equalization chamber of substantially lower volume stiffness, which adversely affected the stiffness of the load bearing chambers.

SUMMARY OF THE INVENTION

The invention provides an elasto-hydraulic vibration isolator which overcomes the above problems. An isolator of the invention has a core, a frame and means defining plural fluid-filled variable volume chambers between the core and the frame which bear loads exerted between the core and the frame. At least two fluid tracks are provided in communication with the chambers. If the tracks are tuned to have different resonant frequencies, then the stiffness versus frequency curve for the isolator will exhibit two notches, one at each resonant frequency, so that the isolator can suppress vibrations at two distinct frequencies. If the tracks are tuned to have the same resonant frequency, then a single, deeper notch results, for improved vibration isolation at that frequency.

In an especially useful form, four load bearing fluid filled variable volume chambers are provided and one fluid track provides communication between two of the chambers and another fluid track provides communication between the other two of the chambers. Each two connected chambers can be arranged so that each chamber is diagonally opposite from its connected chamber, as viewed relative to planes through the core between the chambers which divide the isolator into quadrants, one quadrant containing each chamber. Thereby, volumetric symmetry is provided from one lateral side of the isolator to the other to help keep the loading of the isolator symmetrical and directed along a single axial direction.

The invention also provides for selectively providing communication between a fluid filled variable volume chamber and a fluid expansion chamber. The expansion chamber is divided by a flexible diaphragm into a gas filled subchamber and a fluid filled subchamber. A porous flow restrictor provides communication between the variable volume fluid filled chamber and the fluid filled subchamber for a relatively slower rate of pressure change and snubs significant communication for a relatively higher rate of pressure change. Thereby, slow pressure changes as are caused by the fluid changing temperature produce a flow through the restrictor which is sufficient to substantially eliminate any pressure drop across the restrictor, and the expansion or contraction of the gas subchamber serves to keep the system static fluid pressure relatively constant. For rapidly changing pressures however, as result from the isolator being subjected to vibrations, no significant flow is allowed through the restrictor so that the fluid cannot bypass the fluid tracks by flowing into the expansion chamber.

In another useful aspect, the invention provides a structure for increasing the depth and bandwidth of the notch of the stiffness versus frequency curve for a fluid filled variable volume load bearing chamber. In this aspect, a tubular ring shaped member reinforces an elastomeric body which defines the chamber and is positioned coaxially with the chamber so as to increase the hoop strength of the body, without appreciably increasing its compression strength. Preferably, the member has an internal diameter which is approximately equal to the diameter of the chamber, and is molded into the body at or near the internal surface of the body which defines the chamber, so that the body can squash outwardly when it is subjected to an axial compressive load but so that the tubular ring helps contain the pressure within the chamber.

BRIEF DESCRIPTION OF THE DRAWINGS

FIG. 8 is a cross sectional view of the embodiment of FIG. 6 as viewed from the lines 8—8 of FIG. 6;

DETAILED DESCRIPTION OF THE PREFERRED EMBODIMENTS

Figure 1:
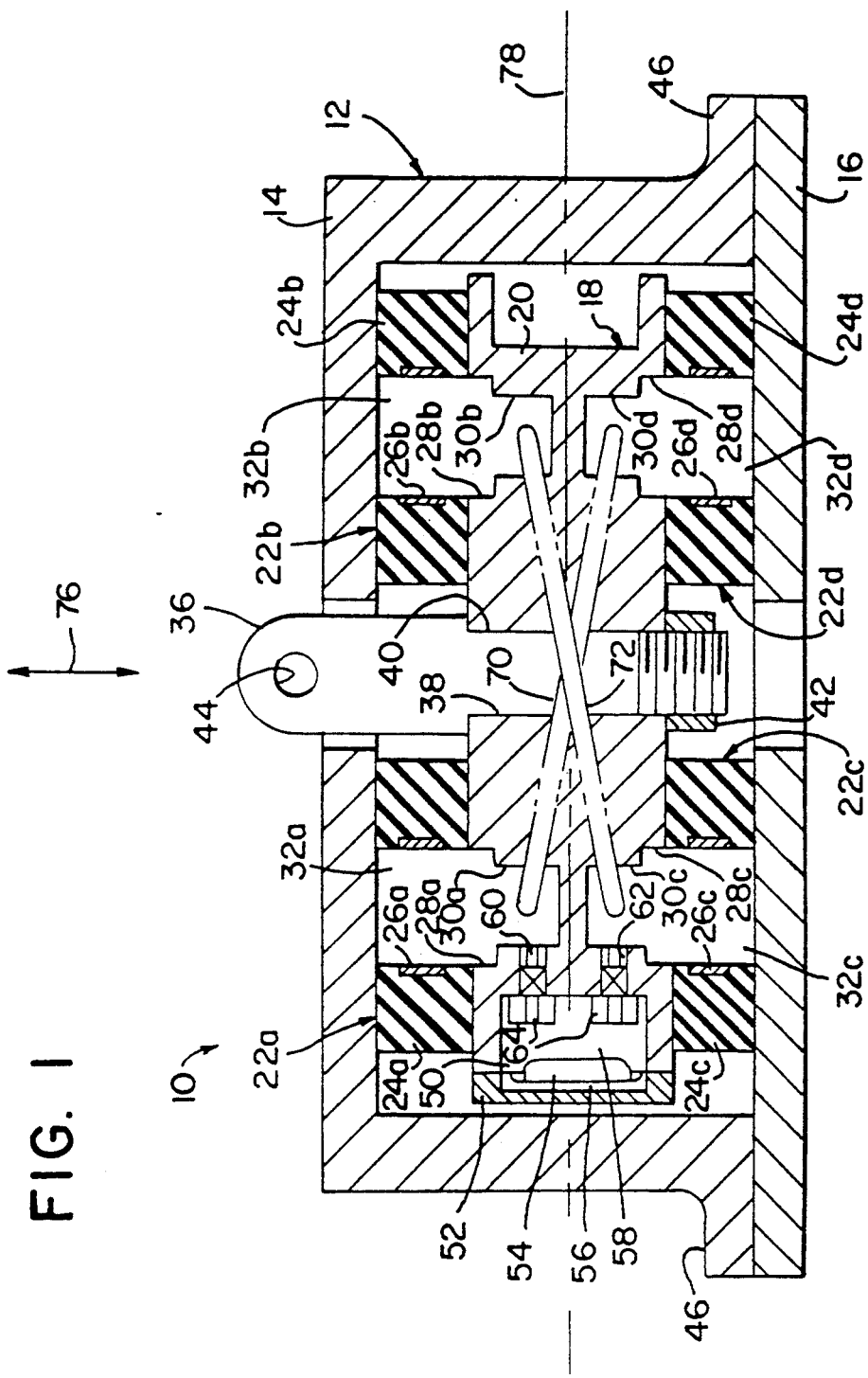
FIG. 1 is a cross sectional view of an elasto-hydraulic vibration isolator of the invention.

Referring to FIG. 1, an elasto-hydraulic vibration isolator 10 is shown. The isolator 10 has a frame 12 which includes a housing 14 and a load plate 16 which are secured together by any appropriate means, such as threaded fasteners (not shown). The frame 12 encloses a molded assembly 18 which includes a core 20 and two chamber elements 22a and 22b on the top side of the core 20 between the core 20 and the frame 12 and two chamber elements 22c and 22d on the bottom side of the core 20 between the core 20 and the frame 12. Each chamber element 22a-d includes an elastomeric body 24a-d, which may be made from a suitable silicone rubber, and a reinforcing element 26a-d, which is molded into the corresponding elastomeric body 24a-d at the interior surface of the chamber element 22a-d.

In conjunction with corresponding bores 28a-d and 30a-d in the core 20, the chamber elements 22a-d define stepped cylindrical chambers 32a-d. A lug 36 is secured to the core 20 by being inserted into a central mounting bore 38. The lug has a shoulder 40 abutting the top of the core 20 and a nut 42 fastened onto the bottom of the lug 36 and tightened into abutment with the core 20. The lug 36 extends up through the housing 14 and has a pin hole 44 for making an external connection, such as to a vibration source or to a structure to be isolated from vibrations. Suitable means, such as flanges 46 of frame 12, are also provided on the frame 12 for securing the frame 12 to a vibration source or other structure.

At the left end of the core 20 as viewed in FIG. 1, a fluid expansion chamber 50 is defined. The fluid expansion chamber 50 is closed off at its far end by a cap 52 and is subdivided by a flexible elastomeric diaphragm 54 into a gas subchamber 56 on the left side of the diaphragm 54 and a fluid subchamber 58 on the right side of the diaphragm 54.

A hole 60 extending between the fluid subchamber 58 and chamber 32a is drilled and tapped in the core and another hole 62 extending between the fluid subchamber 58 and the stepped cylindrical chamber 32c is drilled and tapped. Each of the holes 60 and 62 is plugged by a flow restriction element 64. In the preferred embodiment, the flow restriction elements 64 are porous bodies, such as a plug made of sintered metal. A suitable sintered metal flow restriction element is commercially available under the designator EW from Cajon Company of Macedonia, Ohio. This particular flow restriction element is made of sintered 316 stainless steel and has a nominal air flow rating of 5000 cc per minute at 25 psig. It may also be possible to use a different type of porous fluid restriction element in the invention, such as one made from formed and compacted wire mesh.

The flow restriction element 64 only allows significant communication between the chambers 32a and c and the fluid subchamber 58 for pressure changes that develop slowly across it, as occurs when the operating temperature of the fluid changes. The temperature changes slowly due to the relatively high heat capacity of the fluid and therefore the volume of the fluid also changes slowly, which causes the pressure drop across the flow restriction element to develop slowly. The elements 64 allow passage of a sufficient flow rate so that the pressure within the fluid envelope remains at a relatively constant pressure, since the gas in the subchamber 56 can be compressed without appreciably increasing its pressure. However, for rapid pressure changes, which result from the rapid volume changes which the chambers 32a-d are subjected to by vibrations, the flow restriction elements 64 effectively cut-off flow, so that the vibrations are dissipated by pumping the fluid in the fluid envelope through the tracks 70 and 72. The fluid therefore cannot bypass the tracks 70 and 72 by being pumped into the fluid subchamber 58.

A first fluid track 70 provides communication between chambers 32a and 32d and a second fluid track 72 provides communication between chambers 32c and 32b. The fluid tracks 70 and 72 are schematically shown and it should be understood that the fluid tracks 70 and 72 could be provided in the form of piping or tubing running external of the molded assembly 18 or could be provided as passageways running through the molded assembly 18, such as would be the case if they were bored in the core 20. The fluid envelope in the elasto-hydraulic vibration isolator 10, is defined by the chambers 32a-d, the fluid tracks 70 and 72 and the fluid subchamber 58. The fluid envelope is filled with a suitable incompressible hydraulic fluid and is a sealed system, meaning that no fluid can enter or exit the system. In the preferred embodiment, a hydraulic fluid commercially available under the designation Fluorinert FC-43 is available from 3M Corporation, St. Paul, Minn. This fluid is a fluorine based hydraulic oil and has a density of 1.6218 E-4 lb-s$^2$/in$^4$ and a viscosity of 2.01 E-7 lb-s/in$^2$. Of course, many other hydraulic fluids are available and could be used in practicing the invention. The fluid is admitted to the fluid envelope through suitable ports (not shown) such as in the chambers 32a-d and in the fluid subchamber 58.

The volume of the fluid subchamber 58 is approximately 30% of the volume of the fluid envelope created by the chambers 32a-d and the tracks 70 and 72, so as to contain sufficient fluid to accomodate expansions and contractions of the fluid in the fluid envelope due to operating temperature variations of the fluid, which typically would be from about 70° F. to about 250° F. The gas subchamber 56 must be large enough to accommodate changes in the volume of the fluid contained within the fluid envelope while maintaining a relatively constant pressure within the gas subchamber 56.

A suitable port (not shown), which is subsequently plugged like the ports for admitting fluid into the fluid envelope, is provided for admitting a compressed gas, such as air, into the gas subchamber 56. Gas is admitted into the subchamber 56 preferably to a pressure of about 80 to 100 psig. Therefore, when static, the fluid in the fluid envelope is at about the same pressure as the gas in the gas subchamber 56, which is preferably about 80 to 100 psig.

Since each of the chamber elements 22a-d includes an elastomeric body 24a-d, the chambers 32a-d are variable in volume when the chamber elements 22a-d are subjected to loading. The isolator 10 is preferably subjected to loading by attaching the lug 16 to a vibration source, such as an aircraft engine and attaching the frame 12 to a structure to be isolated from the vibrations from the engine, such as the air frame. It is preferred to mount the isolator 10 with the lug 36 attached to the vibration source so as to minimize the mass subjected to vibrations.

As the lug 36, and therefore the core 20, is subjected to vibrations, the volume of the chambers 32a-d varies resulting in a pumping action taking place within the fluid envelope. For example, if the core 20 is displaced upwardly as viewed in FIG. 1 due to a vibration, the volume of chambers 32a and b is diminished and the volume of chambers 32c and d is enlarged. As this occurs, fluid tends to migrate from chamber 32a to chamber 32d through fluid track 70 and tends to migrate from chamber 32b to chamber 32c through fluid track 72. When the direction of the displacement changes so that the core 20 starts moving downwardly, the opposite pumping action results, with fluid being pumped from chamber 32d to chamber 32a and from chamber 32c to chamber 32b. Therefore, when the isolator 10 is subjected to vibrations, it can be seen that an alternating fluid pumping action from one chamber on top of the core 20 to another chamber on the bottom of the core 20 through the fluid tracks 70 and 72 results, with the inertia of the fluid changing directions contributing to damp the transmission of vibrations from the core 20 to the frame 12.

It is noted that the chambers 32a-d are arranged with their longitudinal axes parallel to the direction of loading. The direction of loading or axial direction is indicated by line 76 which is coaxial with lug 36 and bore 38, and defines an axis of symmetry of the chambers 32a-d. It is also noted that the direction of loading 76 and a plane through the core 20 identified by line 78, between the upper chambers 32a and b and the lower chambers 32c and d divides the isolator 10 into quadrants. In the preferred embodiment, the chambers 32a-d in communication with each other by fluid track 70 or 72 are diagonally opposite from one another as viewed in the quadrants defined by the axial direction 76 and the lateral plane 78.

While arranging the connected chambers 32a-d so that they are diagonally opposite is preferred, alternatively it is possible to connect the chambers 32a-d so that axially opposite chambers communicate, i.e. chamber 32a could be in communication with chamber 32c through an appropriate fluid track and chamber 32b could be in communication chamber 32d through an appropriate fluid track. Of course if that were done, some other means would have to be provided to communicate the chambers 32b and/or 32d with the fluid subchamber 58 through a fluid restriction element 64.

The amount of displacement of the core 20 relative to the frame 12 is determined in part by the primary support stiffness, which in essence is the stiffness of the isolator 10 as measured between the lug 16 and the frame 12 when the isolator 10 is statically loaded. In the preferred embodiment, the primary support stiffness is approximately 120,000 pounds per inch. The volumetric stiffness of the chambers 32a-d reinforced with a steel ring 26a-d is approximately 19,500 lb/in$^5$. If the chamber elements 22a-d are unreinforced, i.e., with the steel rings 26a-d absent, the volumetric stiffness of the chambers 32a-d is approximately 9,750 lb/in$^5$.

Figure 2:
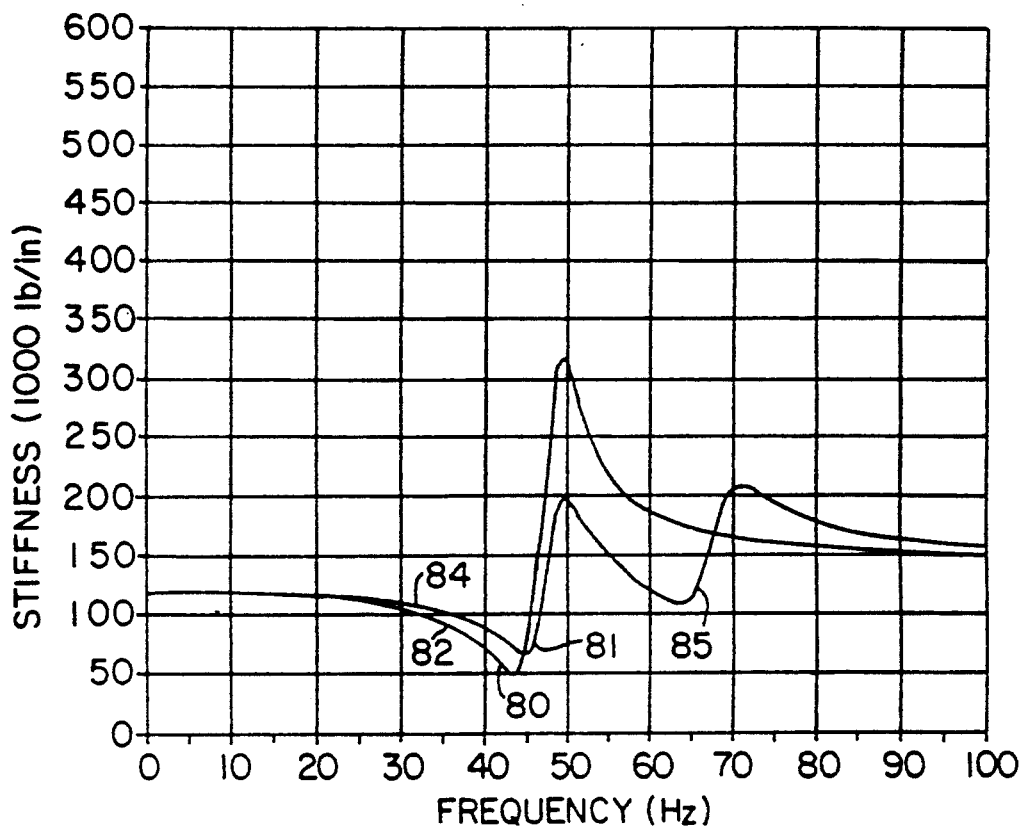
FIG. 2 is a graph of stiffness versus frequency showing one plot with the vibration isolator of FIG. 1 tuned to resonate at a single frequency and another plot with the vibration isolator of FIG. 1 tuned to resonate at two frequencies.

FIG. 2 shows plots for an isolator 10 with unreinforced chamber elements 22a-d, with plot 82 being for the case in which the tracks 70 and 72 are identical to have identical resonance and with the plot 84 for the case in which the tracks 70 and 72 are different, to produce different track resonances. The primary support stiffness is shown in FIG. 2 as 120,000 lb/in for lower frequencies up to about 25 to 30 Hertz, where the notch 80 begins to be defined. To tailor the frequency depth, and bandwidth of the notch identified at 80, it is necessary to tune the variable volume fluid chamber area, the fluid track cross-sectional area, and the fluid track length. The fluid chamber area is the amount of fluid which will be pumped to or from each chamber 32a-d divided by the amount of axial displacement which caused that fluid to be pumped. This is equal to the area of a chamber 32a-d defined by a chamber element 22a-d. For FIG. 2, this area is 0.7854 in$^2$. Also for this embodiment, the cross-sectional area of each fluid track 70 and 72 (i.e., the area open through the track for the passage of fluid), for identical fluid tracks 70 and 72 is 0.0123 in$^2$ and for different fluid tracks is 0.0123 in$^2$ and 0.0246 in$^2$ respectively. In addition, the length of all the fluid tracks is 15.96 in, the height of the variable volume fluid chamber, i.e., that part of the chambers 32a-d defined by the chamber elements 22a-d, is 1.0 in and the elastomer phase angle is 6.5°.

FIG. 2 shows the dynamic stiffness versus frequency for an isolator 10 with identical tracks 70 and 72 as disclosed above, so that the track resonance was identical, and with different tracks 70 and 72, so that there was a difference in the resonance of the two tracks. The identical track resonance curve is identified as 82 and the offset track resonance curve is identified as 84. For both curves, the notches 80 and 81 occur at approximately the same frequency, about 45 Hertz, and are of approximately the same bandwidth, from about 25 to 30 Hertz to about 47 to 48 Hertz, but the notch 81 is not quite as deep as the notch 80. However, the offset track resonance curve 84 has a second notch 85 occurring at a distinctly higher frequency of about 65 Hertz. The identical track resonance curve 82 shows no such second notch but shows the typical characteristic in which the stiffness increases after the notch and then diminishes to a relatively constant value.

Figure 3:
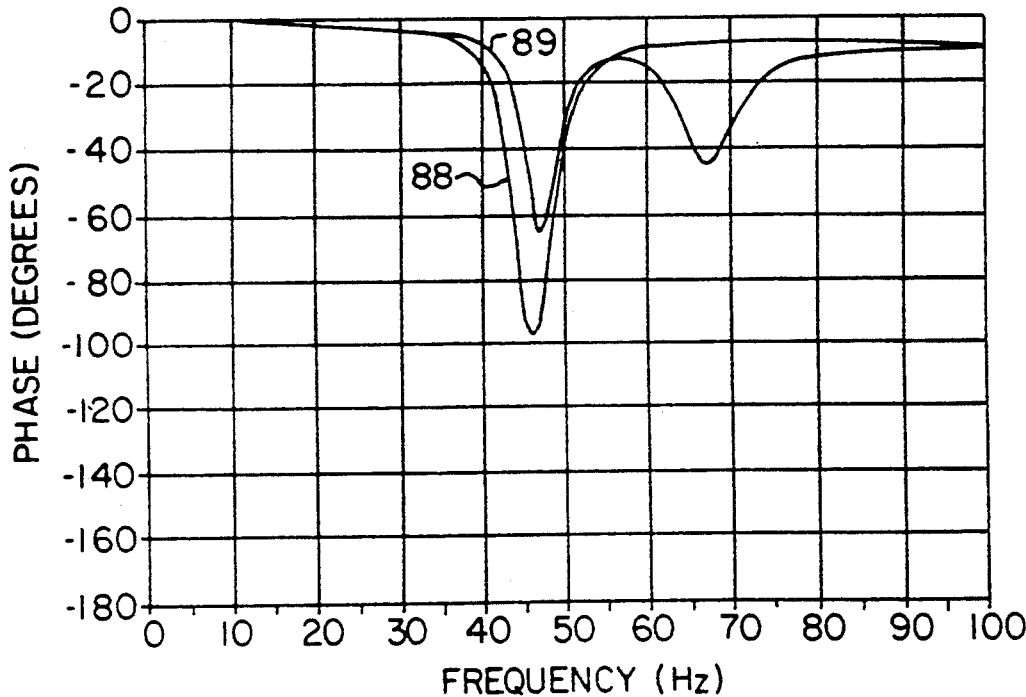
FIG. 3 is a graph of phase versus frequency showing plots corresponding to the plots of FIG. 2.

FIG. 3 is the phase versus frequency graph which corresponds to the dynamic stiffness versus frequency graph of FIG. 2. Curve 88 plots the identical track resonance case and curve 89 plots the offset track resonance case. The magnitude of the phase shift indicates the degree of damping achieved. As shown, the offset resonance curve 89 shows not only a phase shift at about 47 Hertz, but also a phase shift at about 68 Hertz. Thus, it is possible to produce damping at two distinct frequencies in an elasto-hydraulic vibration isolator of the invention.

Figure 4:
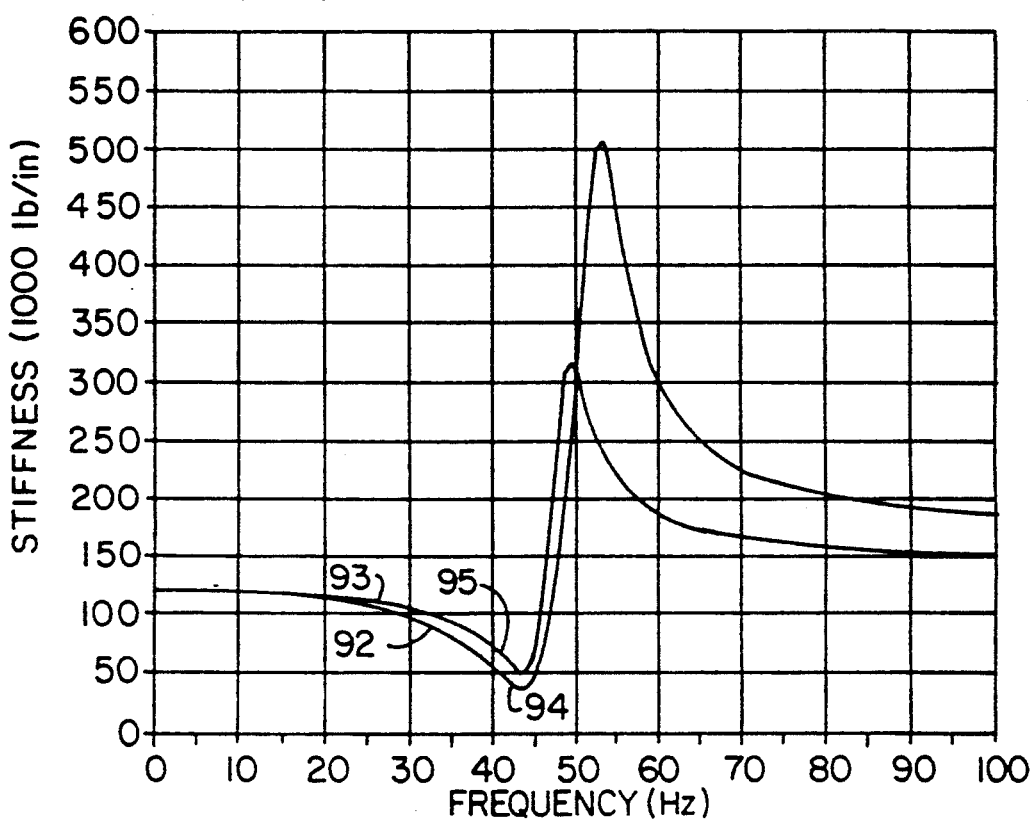
FIG. 4 is a graph of stiffness versus frequency showing one plot with the vibration isolator of FIG. 1 tuned to resonate at a single frequency and with chamber reinforcing elements as shown in FIG. 1 and another plot with the reinforcing elements absent.
Figure 5:
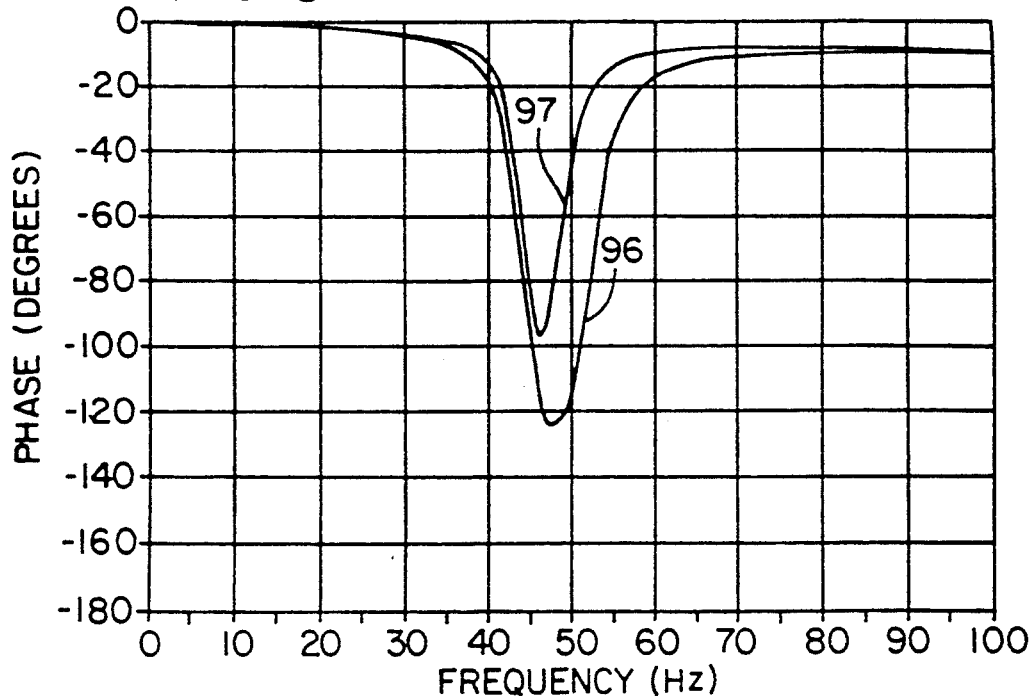
FIG. 5 is a graph of phase versus frequency showing plots corresponding to the plots of FIG. 4.

It is also illustrative to compare the case in which the chamber elements 22a–d are reinforced by a steel ring reinforcing element 26a–d to that in which the elements 22a–d are not reinforced. This comparison is presented in FIGS. 4 and 5, which are respectively dynamic stiffness and phase versus frequency graphs. In FIG. 4, curve 92 indicates the case in which the elements 22a–d are reinforced with a tubular steel ring 26a–d, and curve 93 represents the situation with no reinforcing element 26a–d. The notches 94 and 95 for the curves 92 and 93 occur at approximately the same frequency, i.e. about 43 Hertz. However, the notch 94 of the steel ring reinforced elements 22a–d has a broader bandwidth and is deeper than the notch 95 of curve 93, for the unreinforced version. Adding the reinforcement increases the hoop strength of the chamber elements 22a–d with the desirable effect of deepening and broadening the bandwidth of the notch for the vibration isolator 10. A corresponding improvement in damping for the reinforced version is also shown in FIG. 5, in which curve 96 represents the reinforced version and curve 97 represents the unreinforced version.

Each reinforcing element 26a–d is preferably a tubular ring shaped element, meaning that it is a relatively thin walled hollow cylindrical element, arranged coaxial with the corresponding chambers 32a–d, in which its wall thickness is smaller than its axial length. It is also preferably molded at or near the interior surface of the chamber elements 22a–d and must be somewhat shorter than the elastomeric bodies 24a–d. As thereby constituted, the tubular ring reinforcing elements 26a–d serve to contain the pressures within the chambers 32a–b so that the elastomeric bodies 24a–d are not subjected to excessive pressures which may otherwise cause them to balloon out. However, the tubular shaped reinforcing elements do not materially affect the compression strength of the chamber elements 22a–d in the axial direction. While in the preferred embodiment, the reinforcing elements are made of steel, they could be made of any suitable material having a high hoop strength, such as plastic, fabric, or other materials.

Figure 6:
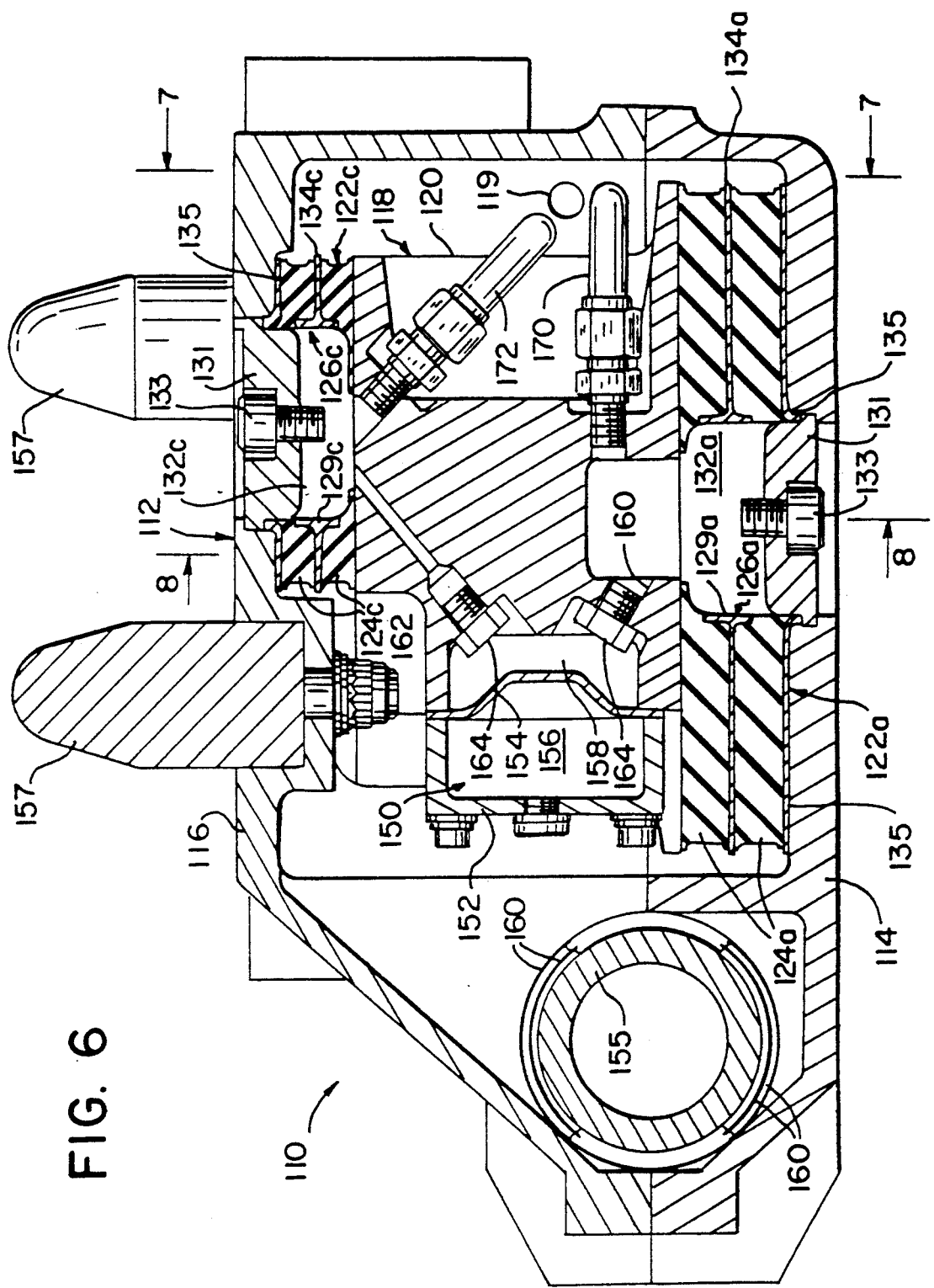
FIG. 6 is a cross sectional view of a second embodiment of an elasto-hydraulic vibration isolator of the invention as viewed from the lines 6—6 of FIG. 7.
Figure 7:
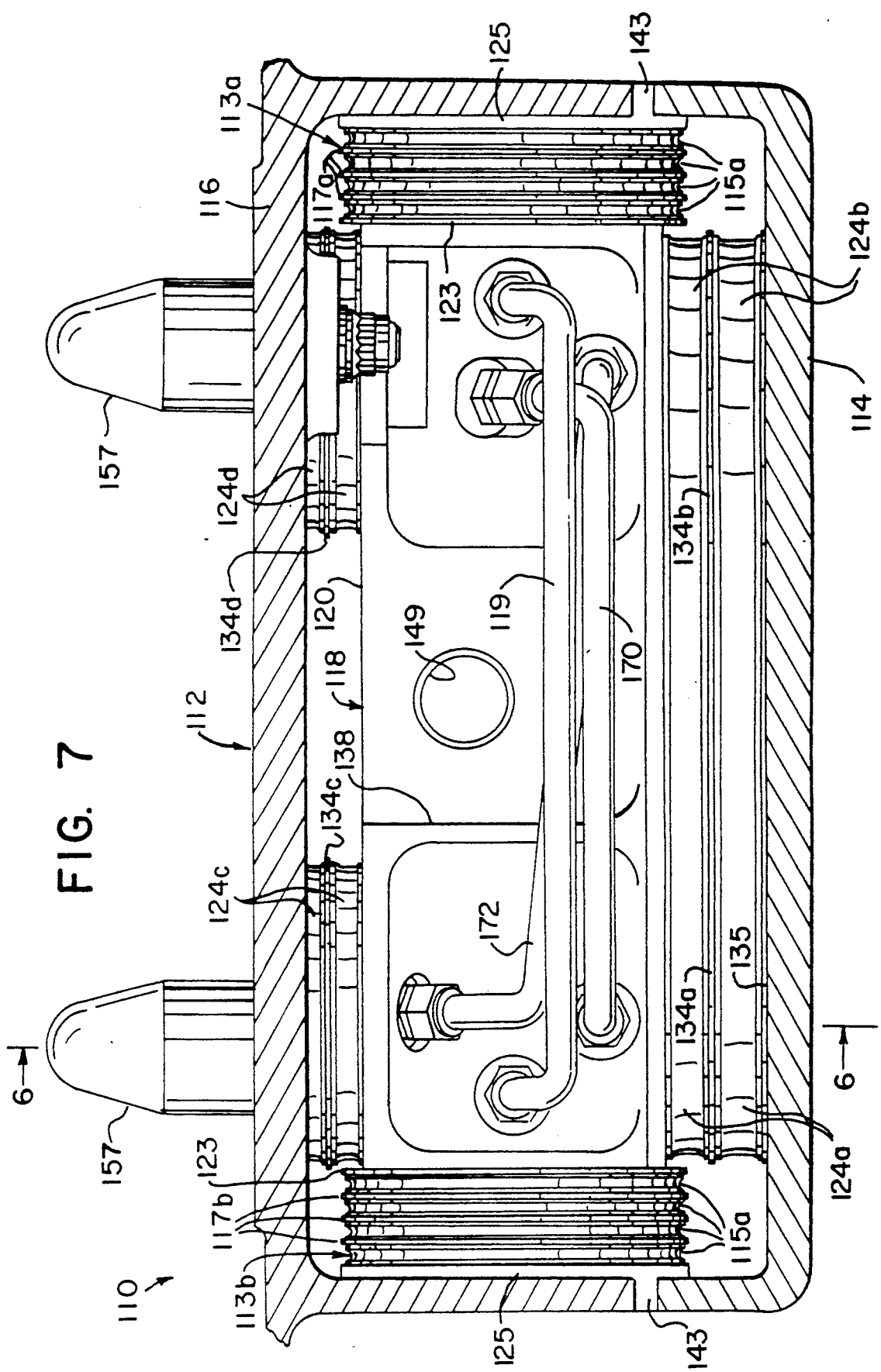
FIG. 7 is a cross sectional view of the embodiment of FIG. 6 as viewed from the lines 7—7 of FIG. 6.

FIGS. 6–8 illustrate an alternative embodiment 110 of the invention which is substantially identical to the embodiment 10 described above except for being provided with laterally disposed chamber elements 113a and 113b (FIGS. 7 and 8) which act to support lateral loads and absorb vibrations transmitted along the lateral axis. Each lateral chamber element 113a and b has an elastomeric body 115a and b and annular steel ring reinforcing elements 117a and b molded into the elastomeric body 115a and b. A third fluid track conduit 119 places the respective chambers 121a and b defined by the chamber elements 113a and b are capped off at their ends by end pieces 123 and 125 with the end pieces 123 and 125 providing a seal against the respective core 120 and frame 112. Removable plugs 127 are provided in each end piece 125 so as to allow filling the fluid envelope defined by the chambers 121a and b and the third conduit 119 with an incompressible fluid such as the fluid previously referred to. Each end piece 125 also has a positioning tab 143 captured in the frame 112 between the housing 114 and the housing 116 which make up the frame 112.

The fluid envelope of the lateral chambers 121a and b is separate from and does not communicate with the fluid envelope of the chambers 132a–d. The fluid envelope of the chambers 121a and b also does not communicate with the fluid expansion chamber 150, although means for communicating it with the fluid expansion chamber 150 could be provided if desired.

In the isolator 110, the chamber elements 122a–d are provided with caps 131 which each have a removable threaded plug 133 for adding or removing fluid from the fluid envelope of the chambers 132a–d. Each of the chamber elements 122a–d also has molded on its outer surface an end flange 135 which forms a seal with the respective cap 131. In addition, the reinforcing elements 126a–d in the chamber elements 122a–d each have a tubular ring shaped portion 129a–d which runs parallel to the axes of the respective chambers 132a–d and an annular flange portion 134a–d which extends orthogonally outwardly from the corresponding tubular ring portion 129a–d. The annular flange portions 134a–d are sandwiched between two elastomeric layers of the respective elastomeric bodies 124a–d so that hoop stresses exerted upon the elastomeric bodies 124a–d are born at least partially by being transmitted through the annular flange portions 134a–d and reacted against by the strength of the corresponding reinforcing element 126a–d. It is also noted that the chamber elements 122c and d are integrally molded, as best shown in FIG. 7.

The mounting of the core 120 to a vibration source or other structure also differs from the mount describe for the core 20 of the isolator 10. The core 20 has a recess 138, analogous to the bore 38 of the first embodiment, but the recess 138 is adapted to receive a lug 145 of an engine mounting yoke 147, shown in phantom, which may be used in the aft mount of an aircraft jet engine. A pin hole 149 is provided in the core 20 at the recess 138 to receive a pin to secure the yoke 147 to the core 120. The yoke 147 also has clevises 139 which receive pins 151 that extend through bores 153 in the frame 112. The bores 153 are larger than the pins 151 and in operation, when the engine is exerting normal thrust loads, the pins 151 float freely in the bores 153 so that vibrations are transmitted to the core 120, and not directly between the pins 151 and the bores 153. As shown in FIG. 8, the pins 151 and bores 153 are shown in their static positions, with the pins 151 abutting the tops of the bores 153.

In addition, the isolator 110 is also provided with a tubular torsion spring 155 which extends through the frame 112, consisting of housings 114 and 116, from one end to the other and has means (not shown) at both ends for connection to the aircraft engine through yoke 147 and attaches intermediate its ends through elastomeric bearings 160 indirectly to the aircraft engine pylon through the isolator frame 112. The torsion spring 155 is provided to react against loads exerted by the engine tending to roll. Tapered pins 157 are also provided which extend from the top of the frame 112 and fit into similarly shaped recesses of the pylon to react against lateral loads. The spring 155 and pins 157 are merely specific features of a particular mounting arrangement for the isolator 110, and form no part of the present invention.

Numerous modifications and variations of the embodiments disclosed will be apparent to those skilled in the art, but which will still incorporate the spirit of the invention. Therefore, the invention should not be limited to the preferred embodiments disclosed, but should be defined by the claims that follow.

We claim:

1. An elasto-hydraulic vibration isolator comprising:
   a frame;
   a core movable in an axial direction relative to the frame;
   means defining at least two sets of variable volume fluid-filled chambers between said core and said frame, at least two of said chambers being on a first side of said core and at least two of said chambers being on a second side of the core, said second side being opposite of said first side in said axial direction, and each said set including at least one chamber on each of said first and second sides; and
   fluid track means directly communicating chambers on the first side with chambers on the second side to place the chambers of each set in direct communication with one another and to isolate the sets from direct communication with one another;
   wherein said means defining said variable volume fluid-filled chambers includes an elastomeric body defining said chambers, and further including a tubular ring shaped reinforcing member positioned coaxially with each chamber.

2. An elasto-hydraulic vibration isolator comprising:
   a frame;
   a core movable in an axial direction relative to the frame;
   means defining at least two sets of variable volume fluid-filled chambers between said core and said frame, at least two of said chambers being on a first side of said core and at least two of said chambers being on a second side of said core, said second side being opposite of said first side in said axial direction, and each said set including at least one chamber on each of said first and second sides;
   fluid track means directly communicating chambers on the first side with chambers on the second side to place the chambers of each set in direct communication with one another and to isolate the sets from direct communication with one another;
   an expansion chamber; and
   a flow restrictor made of a porous material having multiple openings so as to be permeable to a fluid contained within said two sets of variable volume fluid-filled chambers, said flow restrictor selectively providing communication between at least one of said variable volume fluid-filled chambers and said expansion chamber.

3. An elasto-hydraulic vibration isolator as in claim 2, wherein said porous material is sintered metal.

4. An elasto-hydraulic vibration isolator as in claim 2, wherein a plurality of flow restrictors are provided with at least one of said flow restrictors provided for each set of chambers which are in direct communication with one another.

5. An elasto-hydraulic vibration isolator, comprising:
   a core;
   a frame;
   means defining a first fluid-filled variable volume chamber between said core and said frame, said chamber bearing loads exerted between said core and said frame;
   means defining a second fluid-filled variable volume chamber;
   fluid track means connecting said first and second chambers;
   means defining an expansion chamber, said means including a flexible diaphragm dividing said expansion chamber into a gas filled subchamber and a fluid filled subchamber; and
   a flow restrictor made of a porous material having multiple openings so as to be permeable to a fluid contained within said variable volume chambers, said flow restrictor providing communication between at least one of said variable volume fluid filled chambers and said fluid filled subchamber for a relatively slower rate of pressure change and snubbing said communication for a relatively higher rate of pressure change.

6. An elasto-hydraulic vibration isolator as in claim 5, wherein said porous material is sintered metal.

7. An elasto-hydraulic vibration isolator, comprising:
   a core;
   a frame;
   first and second sets of chambers, said sets not being in direct communication with one another and each said set including at least one fluid-filled variable volume chamber between said core and said frame on a first side of said core and at least one other fluid-filled chamber between said core and said frame on a second side of said core, said second side being opposite from said first side, and both said chambers of each said set bearing load exerted between said core and said frame; and
   fluid track means connecting the chambers of each set.

8. An elasto-hydraulic vibration isolator as in claim 7, wherein the chambers of each set are positioned so as to be diagonally opposed relative to one another.

9. An elasto-hydraulic vibration isolator as in claim 8, wherein the chambers on the first side of the core are axially aligned with the chambers on the second side of the core.

10. An elasto-hydraulic vibration isolator, comprising:
    a core;
    a frame;
    an elastomeric body defining a fluid-filled variable volume chamber between said core and said frame, said chamber bearing loads exerted between said core and said frame; and
    a tubular ring shaped member reinforcing said body and positioned coaxially with said chamber so as to increase the hoop strength of said body, said member having an axial dimension and a radial dimension, said axial dimension being greater than said radial dimension.

* * * * *